United States Patent
Bainbridge et al.

(10) Patent No.: US 12,092,556 B2
(45) Date of Patent: Sep. 17, 2024

(54) SYSTEMS AND PROCESSES FOR COLLECTING AND TRANSPORTING FLUID SAMPLES

(71) Applicant: EXXONMOBIL TECHNOLOGY AND ENGINEERING COMPANY, Annandale, NJ (US)

(72) Inventors: Samuel C. Bainbridge, Philadelphia, PA (US); Eric B. Senzer, Margate, FL (US)

(73) Assignee: EXXONMOBIL TECHNOLOGY AND ENGINEERING COMPANY, Annandale, NJ (US)

( * ) Notice: Subject to any disclaimer, the term of this patent is extended or adjusted under 35 U.S.C. 154(b) by 327 days.

(21) Appl. No.: 17/787,046

(22) PCT Filed: Dec. 11, 2020

(86) PCT No.: PCT/US2020/064403
§ 371 (c)(1),
(2) Date: Jun. 17, 2022

(87) PCT Pub. No.: WO2021/145985
PCT Pub. Date: Jul. 22, 2021

(65) Prior Publication Data
US 2023/0031586 A1 Feb. 2, 2023

Related U.S. Application Data

(60) Provisional application No. 62/962,479, filed on Jan. 17, 2020.

(51) Int. Cl.
*G01N 1/20* (2006.01)
*G01N 1/10* (2006.01)
*G01N 1/02* (2006.01)

(52) U.S. Cl.
CPC ... *G01N 1/2035* (2013.01); *G01N 2001/1031* (2013.01); *G01N 2001/2071* (2013.01)

(58) Field of Classification Search
CPC ......... G01N 1/2035; G01N 2001/1031; G01N 2001/2071; G01N 1/10; G01N 1/02; B64C 39/024
See application file for complete search history.

(56) References Cited

U.S. PATENT DOCUMENTS

| | | | |
|---|---|---|---|
| 5,279,167 A * | 1/1994 | Peterson | G01N 1/2035 73/864.34 |
| 2007/0180934 A1 | 8/2007 | Morris | |
| 2017/0010624 A1 | 1/2017 | Carpenter | |

FOREIGN PATENT DOCUMENTS

| | | | | |
|---|---|---|---|---|
| WO | 2017072351 A2 | 5/2017 | | |
| WO | WO-2017088051 A1 * | 6/2017 | | G01M 1/20 |
| WO | WO-2018032053 A1 * | 2/2018 | | B65D 51/16 |

OTHER PUBLICATIONS

Written Opinion and International Search Report of corresponding PCT application No. PCT/US2020/064403 mailed Apr. 9, 2021.

* cited by examiner

*Primary Examiner* — Peter J Macchiarolo
*Assistant Examiner* — Anthony W Megna Fuentes
(74) *Attorney, Agent, or Firm* — Vorys, Sater, Seymour and Pease LLP

(57) ABSTRACT

Systems and processes for collecting and transporting a fluid sample. In one embodiment, the system can include at least one apparatus that can include a rotatable shaft, one or more other moving parts, and at least one fluid path containing a lubricating fluid. The system can also include at least one sample container and at least one unmanned aerial vehicle configured to transport the at least one sample container. The system can also include at least one valve that can be (Continued)

configured to open and discharge a sample of the lubricating fluid from the at least one fluid path into the at least one sample container. At least one unmanned aerial vehicle station can be configured to receive the at least one unmanned aerial vehicle. At least one retention and loading mechanism can be configured to move the at least one sample container.

20 Claims, 5 Drawing Sheets

SYSTEMS AND PROCESSES FOR COLLECTING AND TRANSPORTING FLUID SAMPLES

FIELD

Embodiments of the present invention generally relate to systems and processes for determining the operational health of equipment. More particularly, such embodiments relate to systems and processes for gathering and analyzing data and fluid samples from equipment.

BACKGROUND

Equipment located in remote areas or long distances from spare or replacement parts and repair facilities, can be difficult, expensive, and potentially dangerous to access. Unexpected maintenance events for remotely located equipment typically costs tens, hundreds, or even millions of dollars in downtime. As a result, equipment operators usually employ a conservative, scheduled preventative maintenance program to avoid the risks associated with an expensive asset unexpectedly breaking down, especially if the equipment is remotely located. This conservative approach adds operational cost, some of which could be avoided with better or more readily available equipment health related information.

A used oil analysis regimen is typically employed to monitor equipment and oil health. This oil analysis regimen is analogous to routine blood work for humans, for example, blood work taken during a yearly physical. Used oil analysis can provide advanced warning of equipment problems such that preventative measures can be implemented to keep the equipment running. However, used oil analysis for remotely located equipment adds complexity, cost, and risk to equipment operations. Typically, personnel need to travel to the equipment to take samples. Further, unexpected equipment failures require multiple personnel to act immediately, visiting the remote equipment to diagnose and fix the problem. During these failures, used oil samples are taken while the problem is being diagnosed, and used later for additional assessments after the repair has been made. This means the technicians are not using the used oil analysis data to help diagnose what needs to be repaired, nor is the data being leveraged to optimize the maintenance schedule. Rather, they are acting in a reactive manner only. The tension between preventative maintenance actions and avoiding unplanned break downs leads to uncertainty about equipment health.

There is a need, therefore, for systems and processes for safely gathering and/or analyzing data and fluid samples from remotely located equipment to decrease uncertainty about equipment health, to allow for operational changes that extend equipment life, and to make preventative maintenance more predictable and timelier.

SUMMARY

Systems and processes for collecting and transporting a fluid sample are provided. In one embodiment, the system can include at least one apparatus for generating power or electricity. The at least one apparatus can include a rotatable shaft, one or more other moving parts, and at least one fluid path containing a lubricating fluid, wherein the rotatable shaft, the one or more other moving parts, or both are in fluid communication with the lubricating fluid in the at least one fluid path. The system can also include at least one sample container. At least one unmanned aerial vehicle can be configured to transport the at least one sample container to a location separate from the at least one apparatus. At least one valve can be in fluid communication with the at least one fluid path and in fluid communication with the at least one sample container. The at least one valve can be configured to open and discharge a sample of the lubricating fluid from the at least one fluid path into the at least one sample container. At least one unmanned aerial vehicle station can be disposed on or about the at least one apparatus. The at least one unmanned aerial vehicle station can be configured to dock or receive the at least one unmanned aerial vehicle. At least one retention and loading mechanism can be disposed on or adjacent to the at least one apparatus. The at least one retention and loading mechanism can be configured to move the at least one sample container to or about the at least one unmanned aerial vehicle station.

In one embodiment, the process for collecting and transporting a fluid sample can include opening at least one valve to discharge at least one sample of lubricating fluid in at least one fluid path into at least one sample container. The at least one fluid path can be located within an apparatus. The apparatus can be configured to generate power or electricity. The apparatus can include a rotatable shaft and one or more other moving parts. The rotatable shaft, the one or more other moving parts, or both can be in fluid communication with the lubricating fluid in the at least one fluid path. At least one sample container can be external to the at least one apparatus. At least one unmanned aerial vehicle can be configured to transport the at least one sample container containing the at least one sample of lubricating fluid to another location separate from the at least one apparatus. At least one unmanned aerial vehicle station can be disposed on or about the at least one apparatus. The at least one unmanned aerial vehicle station can be configured to dock or receive the at least one unmanned aerial vehicle. At least one retention and loading mechanism can be disposed on or adjacent to the at least one apparatus. The at least one retention and loading mechanism can be configured to move the at least one sample container to or about the at least one unmanned aerial vehicle station. The process can also include disposing, via the at least one retention and loading mechanism, the at least one sample container onto the at least one unmanned aerial vehicle. The process can also include transporting, via the unmanned aerial vehicle, the at least one sample of lubricating fluid to a location separate from the apparatus.

In one embodiment, the process for collecting and transporting a fluid sample can include piercing a surface of a sample container with a filling head mechanism, wherein the filling head mechanism can be in fluid communication with a valve and, after piercing, an interior volume of the sample container. The process can further include opening the valve to discharge a sample of a lubricating fluid in a fluid path into the sample container, wherein the fluid path can be located within an apparatus, and the apparatus can be configured to generate power and electricity. The apparatus can include a rotatable shaft and one or more other moving parts. The rotatable shaft, the one or more other moving parts, or both can be in fluid communication with the lubricating fluid in the fluid path. The sample container can be external to the apparatus. An unmanned aerial vehicle can be configured to transport the sample container containing the at sample of the lubricating fluid to a location separate from the at least one apparatus. An unmanned aerial vehicle station can be disposed on or about the apparatus, wherein the unmanned aerial vehicle station can be configured to dock or receive the unmanned aerial vehicle. A retention and loading mechanism can be disposed on or adjacent to the apparatus, wherein the retention and loading mechanism can be configured to move the sample container to or about the unmanned aerial vehicle station. The process can further include associating metadata with the sample container, wherein a portion of an exterior surface of the sample container comprises a visible identifying symbol, the metadata comprises data that identifies the apparatus, the time and date the sample of lubricating fluid was discharged into the sample container, and at least one operating parameter of the apparatus at the time the sample of lubricating fluid was discharged. The process can further include removably placing or attaching the sample container to a portion of the unmanned aerial vehicle disposed on the unmanned aerial vehicle station and commanding the unmanned aerial vehicle to transport the sample of lubricating fluid to the location.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
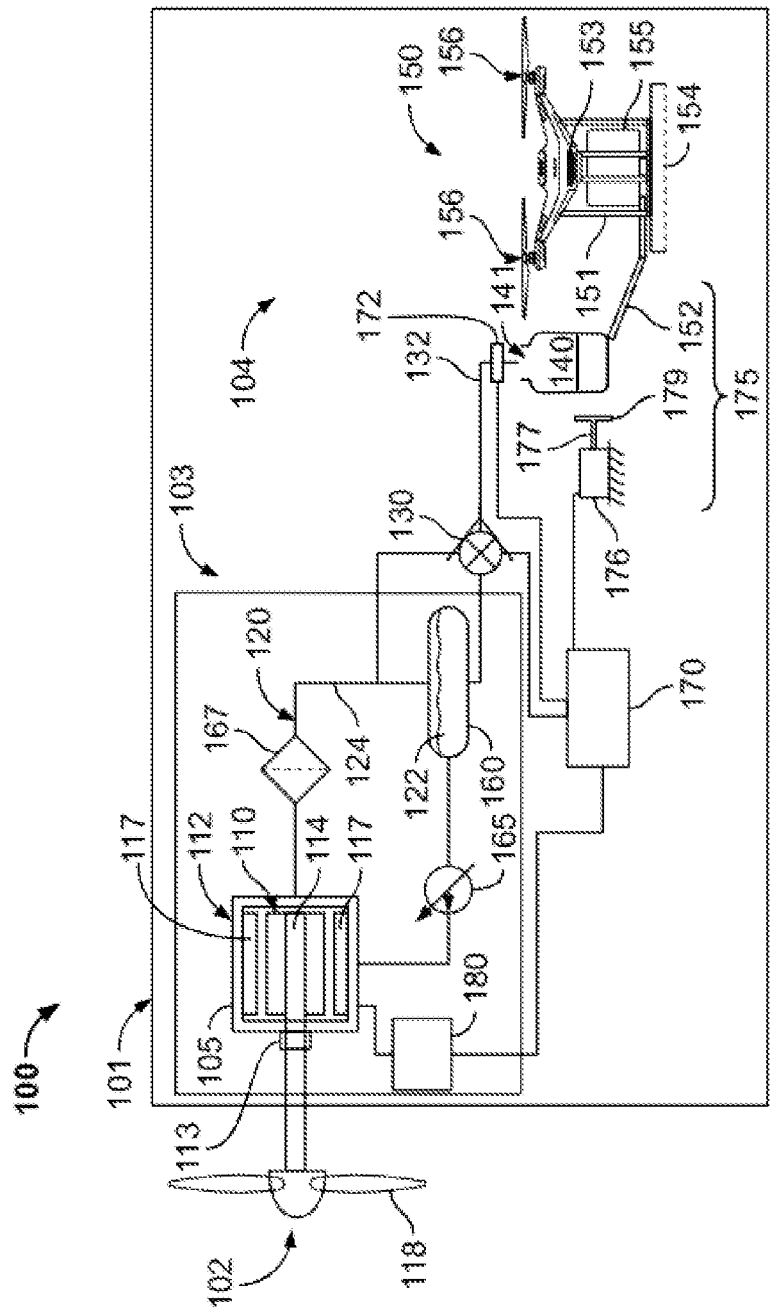
FIG. 1 depicts a schematic of an illustrative system for collecting and transporting a fluid sample, according to one or more embodiments.

It is to be understood that the following disclosure describes several exemplary embodiments for implementing different features, structures, and/or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the exemplary embodiments presented below can be combined in any combination of ways, i.e., any element from one exemplary embodiment can be used in any other exemplary embodiment, without departing from the scope of the disclosure.

FIG. 1 depicts a schematic of an illustrative system 100 for collecting and transporting a fluid sample, according to one or more embodiments. The system 100 can include one or more apparatus for generating power or electricity 103 (one is shown), from which fluid samples can be taken. The system 100 can further include at least one fluid sampling and transportation system 104. The one or more apparatus for generating power or electricity 103 can be disposed within an enclosure 101. The enclosure 101 can be any enclosure including but not limited to a wind turbine enclosure or nacelle. The one or more apparatus for generating power or electricity 103 can be components of a wind turbine and can include, but not be limited to, a generator 112, a gear box, a yaw motor, or a yaw gear drive. A rotor 102 having one or more blades 118 (two are shown) disposed thereon can communicate rotational energy through a rotatable shaft 114 to the apparatus for generating power or electricity 103. A brake 113 can control the speed at which the rotatable shaft 114 can rotate.

The fluid sampling and transportation system 104 can include one or more valves 130 (one is shown), one or more sample containers 140 (one is shown), and an unmanned aerial vehicle 150. The fluid sampling and transportation system 104 can also include a sample conduit 132, a retention and loading mechanism 175, a sample controller 170, and one or more sample sensors 172. The fluid sampling and transportation system 104 can dispense one or more fluid samples, e.g. samples of lubricating fluids, from the apparatus for generating power or electricity 103 into the one or more sample containers 140 and transport the fluid samples in the one or more sample containers 140 to other locations. The fluid sampling and transportation system 104 can be disposed partially or completely within, on, and/or through the enclosure 101.

The apparatus for generating power or electricity 103 can include one or more apparatus enclosures 105 (one is shown) having one or more moving parts 110 (one is shown) therein; a fluid path 120; and an apparatus controller 180. For simplicity and illustrative purposes only, the apparatus for generating power or electricity 103 is depicted as including therein a generator 112 having a rotatable shaft 114 and at least one or more other moving parts 110, disposed within the enclosure 105, that can generate power or electricity for use outside the apparatus for generating power or electricity 103; the fluid path 120 in fluid communication with the generator 112; and the apparatus controller 180. The apparatus for generating power or electricity 103 can be or include, but is not limited to, a vehicle, a generator, an internal combustion engine, an electric motor, a gear drive, a hydraulic cylinder, a pneumatic cylinder, a gear box, a shaft, a brake, a turbocharger, a jet turbine, a supercharger, a battery, or a combination thereof. The apparatus for generating power or electricity 103 may be disposed anywhere on the ground, on a platform, on a vehicle, or on another structure such as a post, building, elevated platform, tower structure, suspended in the air or in space, or the like. The apparatus for generating power or electricity 103 can be stationary or mobile. For example, the apparatus for generating power or electricity 103 may be disposed on a movable vehicle. In other examples, the apparatus for generating power or electricity 103 may be disposed within the enclosure 101, for example a nacelle of a wind turbine, disposed upon a tower structure, and the apparatus for generating power or electricity 103 may rotate with the enclosure 101 about an axis of the tower structure.

The apparatus enclosure 105 can be any enclosure or any structure into which, through which, and/or on which the one or more moving parts 110, in fluid communication with the fluid path 120, can be disposed and operate. The one or moving parts 110 can be any part including but not limited to bearings, gears, pistons, shafts, fasteners, springs, magnets, wires, armatures, turn tables, rotors, impellers, or any part that moves with respect to another part or the apparatus enclosure 105, during operation of the apparatus for generating power or electricity 103. The one or more moving parts 110 can be included within assemblies that can be at least partially disposed within the apparatus enclosure 105. The one or more moving parts 110 can be in fluid communication with a lubricating fluid 122 within the fluid path 120 housed within the apparatus for generating power or electricity 103. The lubricating fluid 122 can lubricate and/or regulate a temperature of the one or more moving parts 110. The lubricating fluid 122 can be or include any lubricating fluid including but not limited to oil, gas, water, instrument or service air, nitrogen, hydraulic oil, gear oil, driveline oil, gas engine and turbine oil, aviation turbine oil, electrical and thermal insulator oil, open gear oil, semi-fluid greases, machining oils and emulsions, honing oil, thermal oil (heat transfer oil), transformer oil, various types of solvents, maintenance oil, or combinations thereof.

The fluid path 120 can include an apparatus conduit 124, a filter 167, a lubricating fluid pump 165, and a lubricating fluid reservoir 160, all in fluid communication with each other. The apparatus conduit 124 can transport the lubricating fluid 122 to, between, and/or within the filter 167, the lubricating fluid pump 165, the lubricating fluid reservoir 160, the apparatus enclosure 105, and the one or more moving parts 110. The filter 167 can be any particulate filter. The filter 167 can use physical filtration, chemical filtration, magnetic filtration, or a combination, to filter particulates from the lubricating fluid 122 when flowing through the filter 167. The lubricating fluid reservoir 160 can be or include any vessel having an internal volume into which at least a portion of the lubricating fluid 122 can be disposed.

The lubricating fluid pump 165 can be any pump capable of pressurizing and moving the lubricating fluid 122 throughout at least a portion of the apparatus conduit 124. For example, the lubricating fluid pump 165 can pressurize the lubricating fluid 122 in the fluid path 120 to move the lubricating fluid 122 though the apparatus conduit 124, throughout the apparatus enclosure 105 and/or the one or more moving parts 110, to the filter 167, and to the reservoir 160. Although depicted as a variable displacement pump, the lubricating fluid pump 165 can be a fixed displacement pump, a pneumatic pump, or any fluid pump.

Referring to the fluid sampling and transportation system 104, the valve 130 can be in fluid communication with the apparatus conduit 124. The valve 130 can also be in fluid communication with the sample conduit 132 such that when the valve is open, the sample conduit 132 can be in fluid communication with the apparatus conduit 124. The apparatus conduit 124 and the sample conduit 132 can be made from any suitable material. For example, the apparatus conduit 124 and the sample conduit 132 can be made from copper, copper alloys, steel alloys, other alloys, a synthetic fiber such as polyester or nylon filament, rubber, synthetic rubbers, polyurethane, vinyl, polyvinyl chloride, glass, a helix of steel alloy wire, a helix polyvinyl chloride plastic, or other suitable materials.

The valve 130 can be or include, without limitation, a sampling valve, flow control valve, pressure reducing valve, a check valve, a combination thereof, or any valve through which a fluid can flow. The operating mechanism for the valve 130 can be or include a ball valve, butterfly valve, diaphragm or membrane valve, gate valve, globe valve, knife valve, needle valve, pinch valve, piston valve, plug valve, and/or solenoid valve. In operation, the valve 130 can be opened and closed manually, through automation, or both, to provide a fluid sample from the lubricating fluid 122. For example, the valve 130 can be a solenoid valve which can be an electrically actuated valve for controlling the amount of lubricating fluid 122 that flows through the valve 130 and into the sample container 140. As explained further below, the valve 130 can direct fluid into the sample container 140 and/or back to the fluid path 120.

The sample container 140 can be any vessel having at least one interior volume capable of holding a fluid sample therein. The interior volume can be divided into two or more interior volumes such that the sample container 140 can receive two or more unique fluid samples therein and sample mixing can be prevented. The sample container 140 can include an aperture 141 through which the fluid sample can flow. The sample conduit 132 can be placed in fluid communication with the interior volume of the sample container 140 such that the fluid sample can be disposed therein. The sample container 140 can include a removeable lid or can be sealed. A stopper can be disposed within and seal the aperture 141 or can be disposed within the lid. A surface of the sample container 140, the lid, or the stopper can be pierced to provide a conduit through which the fluid sample can flow. During operations, the sample container can be located adjacent at the end of the sample conduit 132 and/or the valve 130.

The retention and loading mechanism 175 can be or include cylinders, pistons, rods, conveyors, ramps, latches, stations, robotic arms, carousels, and other components that can hold, manipulate, and/or move the sample container 140. For example, the retention and loading mechanism 175 can include a conveyor or ramp 152 that can move the sample container 140 to a desired location. The retention and loading mechanism 175 can include a cylinder 176, a piston 177, and a head 179 that can impart a force across a surface of the sample container 140 to move the sample container 140 to the desired location. The retention and loading mechanism 175 can be an electromechanical device, a pneumatic device, a hydraulic device, or a combination. The retention and loading mechanism 175 can hold and/or release the sample container 140. The retention and loading mechanism 175 can operate to dispose, removably place, or attach the sample container 140 onto at least a portion of the unmanned aerial vehicle 150.

The head 179 can also be configured to or adapted to deliver, adhere, or print a metadata, regarding the fluid sample, on to the surface of the sample container 140. The metadata can include data that identifies the apparatus for generating power or electricity 103, the time and date the fluid sample was discharged into the sample container 140, and at least one operating parameter of the apparatus for generating power or electricity 103 at the time the fluid sample was discharged. The at least one operating parameter can include a speed, temperature, or vibration of the rotatable shaft 114, a power output, speed, temperature, or vibration of the generator 112, a speed, temperature, or vibration of the gear box, the yaw motor, the yaw gear drive, or other internal or external component, or other operational parameters. The at least one operating parameter can also include one or more environmental conditions such as an ambient temperature within the enclosure 101, a temperature outside the enclosure 101, a humidity inside and/or outside the enclosure 101, wind speeds outside the enclosure 101, or other environmental conditions.

The metadata can be printed directly on the surface of the sample container 140, can be a printed on to a label that is adhered to the surface of the sample container 140, or can be downloaded onto an electronic chip that can be adhered to the surface of the sample container 140 or otherwise disposed thereon or therein. For example, the head 179 can include a print head that can print the metadata onto the sample container 140. The head 179 also can include a transmitter that can transmit the metadata to the electronic chip prior to or after the electronic chip is adhered to the surface of the sample container. In other embodiments, an identifying symbol, such as a quick response ("QR") code or bar code, can be etched, painted, printed, affixed, or otherwise disposed on an outer surface of the sample container 140 and the head 179 can be configured to or adapted to read the identifying symbol. For example, the head 179 can include an electronic camera or reader, such as a QR code or bar code reader, that can read the identifying symbol. The data associated with the identifying symbol can be associated with the metadata for a particular fluid sample and transmitted for future use, such as chain of custody purposes during processing and analysis of a particular fluid sample.

The unmanned aerial vehicle 150 can include a body 151, a cargo area 155, one or more rotors 156 (two are shown) each with one or more blades disposed thereon, and a vehicle controller 153. An unmanned aerial vehicle station 154 can be a location where the unmanned aerial vehicle 150 can land and depart. In examples, the unmanned aerial vehicle station 154 can be located or disposed adjacent the enclosure 101, disposed within the enclosure 101, and/or disposed adjacent the one or more apparatus for generating power or electricity 103. The unmanned aerial vehicle station 154 can be proximate or adjacent the sample container 140 or adjacent a location where the sample container 140 can be loaded or otherwise disposed on the unmanned aerial vehicle 150 present in the unmanned aerial vehicle station 154.

The unmanned aerial vehicle station 154 and/or the unmanned aerial vehicle 150 can also include the conveyor or ramp 152, from the retention and loading mechanism 175, to move the sample container 140 to the desired location, for example to and about the unmanned aerial vehicle station 154 or onto the unmanned aerial vehicle 150. The unmanned aerial vehicle 150 can be configured to or adapted to collect one or more sample containers 140 from the enclosure 101, or if present outside the enclosure 101 from the one or more apparatus for generating power or electricity 103. One or more sample containers 140 can be disposed within or disposed on the unmanned aerial vehicle 150. For example, one or more sample containers 140 can be disposed within the cargo area 155 of the unmanned aerial vehicle 150 and an automated hatch and/or clamping mechanism can enclose and/or grasp at least a portion of each sample container 140 within the cargo area 155 to secure the one or more sample containers 140 for flight. The unmanned aerial vehicle 150 can be configured to or adapted to travel to a location within or proximate the enclosure 101 or the one or more of the apparatus for generating power or electricity 103 to collect one or more sample containers 140. For example, the vehicle controller 153 can contain command and control capabilities to send and receive signals to and from the components in the unmanned aerial vehicle 150 to transport the unmanned aerial vehicle 150 from location to location.

The body 151 can be configured such that the unmanned aerial vehicle 150 can land on the unmanned aerial vehicle station 154 or as described below, hang from structure within the unmanned aerial vehicle station 154. The rotors 156 can be coupled to the body and can be configured and adapted to provide lift and also propel the unmanned aerial vehicle 150.

The vehicle controller 153, the apparatus controller 180, and the sample controller 170 can each include a single microprocessor or multiple microprocessors for sending and receiving signals to and from components of the enclosure 101, including the fluid sampling and transportation system 104. The vehicle controller 153, the apparatus controller 180, and the sample controller 170 can each include the appropriate hardware and software to perform their designated functions. The vehicle controller 153, the apparatus controller 180, and the sample controller 170 can each be pre-programmed and/or reprogrammed to perform new, different, and/or enhanced functions. Although shown as separate controllers, the functions of the vehicle controller 153, the apparatus controller 180, and/or the sample controller 170 can be combined into a single controller. Numerous commercially available microprocessors can be configured to perform the functions of the vehicle controller 153, the apparatus controller 180, and/or the sample controller 170.

The one or more sample sensors 172 can be or include one or more spectroscopic sensors, fluid property sensors, mass flow sensors, volume flow sensors, ultrasonic sensors, induction sensors, light scattering/extinction sensors, viscosity sensors, conductivity sensors, impedance sensors, elemental analysis sensors, magnetic sensors, resonant sensors, or any other suitable sensor, or combinations thereof. In some examples, the one or more sample sensors 172 can measure one or more fluid sample parameters. For example, the one or more sample sensors 172 can measure a content of one or more elements, an authenticity, a viscosity, a dielectric constant, a particle count, a pH, an infrared spectrum, a base number, an acid number, a conductivity, a resistivity, an impedance, a permittivity, a particle size distribution, a water content, an oxidation level, a nitration level, a soot content, a ferrous particle content of the fluid sample, or a combination thereof. In some examples, the one or more sample sensors 172 can measure an iron content, a copper content, a potassium content, a lead content, an aluminum content, a nickel content, a phosphorous, a zinc content, a sulfur content, a silicon content, or a combination thereof. The authenticity of the fluid sample can be measured by comparing a spectroscopic analysis of the fluid sample to the spectroscopic analysis of an original or reference fluid. In some examples, the original fluid can be doped with a composition that would not otherwise be present and is difficult to replicate, allowing spectroscopic analysis of the fluid sample to determine whether or not the fluid sample is authentic. In some examples, the one or more sample sensors 172 can utilize techniques such as, but not limited to, infrared (IR) spectroscopy, x-ray fluorescence ("XRF") spectroscopy, laser induced plasma spectroscopy ("LIPS), inductively coupled plasma atomic emission spectroscopy ("ICP"), radio frequency spectroscopy, rotating disk electrode atomic emission ("RDE") spectroscopy and flow viscometry (e.g., Hele Shaw flow viscometry), ultraviolet-visible spectroscopy, fluorescence spectroscopy, Raman spectroscopy, gas chromatography, gas chromatography/mass spectrometry, liquid chromatography, including high performance liquid chromatography, supercritical fluid chromatograph, liquid chromatography/mass spectrometry, impedance spectroscopy, mass spectrometry, nuclear magnetic resonance or any other suitable technique, or combinations thereof to evaluate chemical, electrical, and physical properties of the fluid sample.

The one or more sample sensors 172 can be disposed between the sample conduit 132 and the sample container 140, as shown, can be disposed within the sample conduit 132, can be disposed within the sample container 140, or can be disposed anywhere the one or more sample sensors 172 can be exposed to at least a portion of the fluid sample. By way of example, in operation the retention and loading mechanism 175 can be configured or adapted to place the one or more sample sensors 172, for a period of time, under a lubricating fluid discharge location of the valve 130 or the sample conduit 132. At specific time intervals or upon user commending, a portion of the fluid sample from the apparatus for generating power or electricity 103 can be directed to, over, or through the one or more sample sensors 172 and the one or more sample sensors 172 can perform an analysis of the fluid sample. The one or more sample sensors 172 can send data associated with the analysis to the sample controller 170. The sample controller 170 can determine from the received data if at least one fluid sample parameter is outside a pre-determined value or range of values that may be stored in a look up table stored within or available to the sample controller 170. If at least one fluid sample parameter is outside the value or range or values, the sample controller 170 can send signals to the fluid sampling and transportation system 104 to take a fluid sample from the one or more of the apparatus for generating power or electricity 103 and command the fluid sample to be transported to another location, for example to a lab or remote location for additional analysis and/or testing.

Still referring to FIG. 1, in operation the apparatus controller 180 can send and receive signals to and from the generator 112, the lubricating fluid pump 165, or to any apparatus for generating power or electricity 103 within the enclosure 101 to monitor and control one or more operational parameters of the generator 112, the lubricating fluid pump 165, or any apparatus for generating power or electricity 103. The sample controller 170 can send and receive signals to and from the valve 130, the retention and loading mechanism 175, and the one or more sample sensors 172 for control and monitoring. The sample controller 170 and the apparatus controller 180 can be communicatively coupled. For example, the sample controller 170 and the apparatus controller 180 can send and receive signals to and from each other, such that the sample controller 170 can control and monitor the one or more apparatus for generating power or electricity 103 and the fluid sampling and transportation system 104, to send signals to take a fluid sample from the one or more apparatus for generating power or electricity 103, and send the fluid sample to another location, for example to a lab or remote location for analysis and/or testing.

The apparatus controller 180 can send apparatus operating parameters to the sample controller 170. The sample controller 170 can determine if at least one of the received apparatus operating parameters is outside a pre-determined value or range of values that may be stored in the look up table stored within or available to the sample controller 170. If at least one of the received apparatus operating parameters is outside the value or range or values, the sample controller 170 can send signals to the fluid sampling and transportation system 104 to take a fluid sample from one or more of the apparatus for generating power or electricity 103 and send the fluid sample to another location, for example to a lab or remote location for analysis and/or testing.

If at least one of the received apparatus operating parameters is outside the value or range or values, the sample controller 170 can send signals to the apparatus controller 180 to modify and maintain at least one operating parameter of the apparatus for generating power or electricity 103 at, below, or above a pre-determined value or range of values. For example, the brake 113 can be applied to reduce the rotational speed of the rotatable shaft 114 to slow the operation of the generator 112, thereby reducing the stress levels on the generator 112 while the fluid sample is being analyzed and/or tested. In other examples, a pitch and/or yaw angle of the rotor 102 blades 118 can be adjusted to reduce the rotational speed of the rotatable shaft 114 to slow the operation of the generator 112, thereby reducing the stress levels on the generator 112 while the fluid sample is being analyzed and/or tested. In still other examples, a flow rate of the lubricating fluid 122 through the fluid path 120 can be increased to increase the heat transferred away from the generator 112, thereby reducing the stress levels on the generator 112 while the fluid sample is being analyzed and/or tested. By operating the generator 112 at a pre-determined value or range of values, the apparatus for generating power or electricity 103 can be protected from damage that may occur if the generator 112 were to continue to run as normal.

The sample controller 170 can be communicatively coupled to the vehicle controller 153 to send and receive data to and/or command or otherwise control the unmanned aerial vehicle 150 to transport to one or more locations, for example, the unmanned aerial vehicle station 154 or other locations. The sample controller 170 and the vehicle controller 153 can be communicatively coupled to other locations, such as a control center, for sending and receiving data as well as receiving command and control signals. The control center can command or otherwise control the unmanned aerial vehicle 150 to travel to one or more locations, for example, the unmanned aerial vehicle station 154 or other locations. Prior to sending the fluid sample to another location, the sample controller 170 can send signals to the one or more sample sensors 172 to analyze a portion of the fluid sample and generate sensor data related to at least one physical property of the fluid sample. The one or more sample sensors 172 can send the sensor data to the sample controller 170 and the sample controller 170 can receive and compare the sensor data to data within a lookup table stored within or available to the sample controller 170. Based on the comparison, the sample controller 170 can send signals to the vehicle controller 153 to transport the fluid sample to another location for further fluid sample analyses and/or testing. For example, determining a need for further fluid sample analyses and/or testing can include comparing the received sensor data with at least one predetermined sensor data parameter threshold from the lookup table. If the sensor data are outside the threshold, the sample controller 170 can send signals to the vehicle controller 153 to transport the fluid sample to another location, for example for further analyses and/or testing.

The apparatus controller 180, the sample controller 170, and the vehicle controller 153 can communicate utilizing one or more communication standards or buses. For example, the apparatus controller 180, the sample controller 170, and the vehicle controller 153 can send and receive signals utilizing communication standards such as Ethernet, Industrial Ethernet, Profibus, Modbus, Foundation Fieldbus, or any suitable standard. The communications can be sent utilizing radio frequency signals, over hard lines, or combinations thereof. The apparatus controller 180, the sample controller 170, and the vehicle controller 153 may additionally include other components and may also perform other functions not described herein.

To transport a fluid sample, one or more unmanned aerial vehicles 150 can be flown to or stationed on or above the at least one unmanned aerial vehicle station 154. For example, the one or more unmanned aerial vehicles 150 can be located elsewhere and can be commanded to travel to the one or more unmanned aerial vehicle stations 154. The lubricating fluid pump 165 can be controlled by the apparatus controller 180 to flow lubricating fluid through the fluid path 120 to the valve 130. For example, the lubricating fluid pump 165 can pressurize the lubricating fluid 122 in the fluid path 120 to flow the lubricating fluid 122 through the apparatus conduit 124 to the valve 130.

The sample controller 170 can send a signal to open the valve 130 to allow fluid communication between the apparatus conduit 124 and an outlet of the valve 130, which can be in fluid communication with the sample container 140. Accordingly, the lubricating fluid 122 in the fluid path 120 can flow into the sample container 140. The outlet of the valve 130 can be in fluid communication with the sample conduit 132. The lubricating fluid 122 can flow through the valve 130, through the sample conduit 132, and into the sample container 140. The sample controller 170 can send a signal to open and close the valve 130 for a period of time such that a known or pre-determined amount of lubricating fluid 122 can flow through the valve 130 during the time the valve is open. Fluid samples can be taken from any location along the fluid path 120. For example, fluid samples can be taken before and/or after the reservoir 160 (as shown) and/or before and/or after the filter 167, or anywhere along the fluid path 120. In examples, one or more fluid samples can be taken successively from two or more locations along the fluid path 120 and flowed into one or more sample containers 140 for transport by one or more unmanned aerial vehicles 150.

The sample container 140 can be disposed close to or adjacent to the apparatus for generating power or electricity 103 from which a sample of the lubricating fluid 122 may be taken. The unmanned aerial vehicle 150 can be dispatched to transport one or more empty sample containers 140 to and from the fluid sampling and transportation system 104. The retention and loading mechanism 175 can be commanded to dispose the one or more empty sample containers 140 close to or adjacent the apparatus for generating power or electricity 103 from which a fluid sample may be taken. After providing the fluid sample into the sample container 140, the retention and loading mechanism 175 can be commanded to release the sample container 140 so that the sample container 140 can be flown to another location and/or to move the sample container 140 and load, removably place, or otherwise attach the sample container 140 onto a portion of the unmanned aerial vehicle 150 for transport to another location, for example to a lab or remote location for analysis and/or testing. After the sample container 140 is released and/or disposed on the unmanned aerial vehicle 150, the sample controller 170 or the vehicle controller 153 can send one or more signals, for example to the unmanned aerial vehicle 150, to command or otherwise provide commands to the unmanned aerial vehicle 150 such that the unmanned aerial vehicle 150 transports the fluid sample. Based on test results performed on one or more fluid samples, a repair or maintenance plan can be created for the apparatus for generating power or electricity 103 and a repair team can be dispatched, if necessary, with the proper equipment and spare parts to perform an appropriate maintenance or repair action, saving potentially significant apparatus downtime.

Although depicted as having the fluid path 120 and the apparatus for generating power or electricity 103, the system 100 can include two or more fluid paths and two or more apparatus for generating power or electricity. Fluid samples from each of the two or more fluid paths from each of the two or more apparatus for generating power or electricity can be routed to one retention and loading mechanism 175 and into one or more sample containers 140 for transport, analysis, and/or testing.

Figure 2:
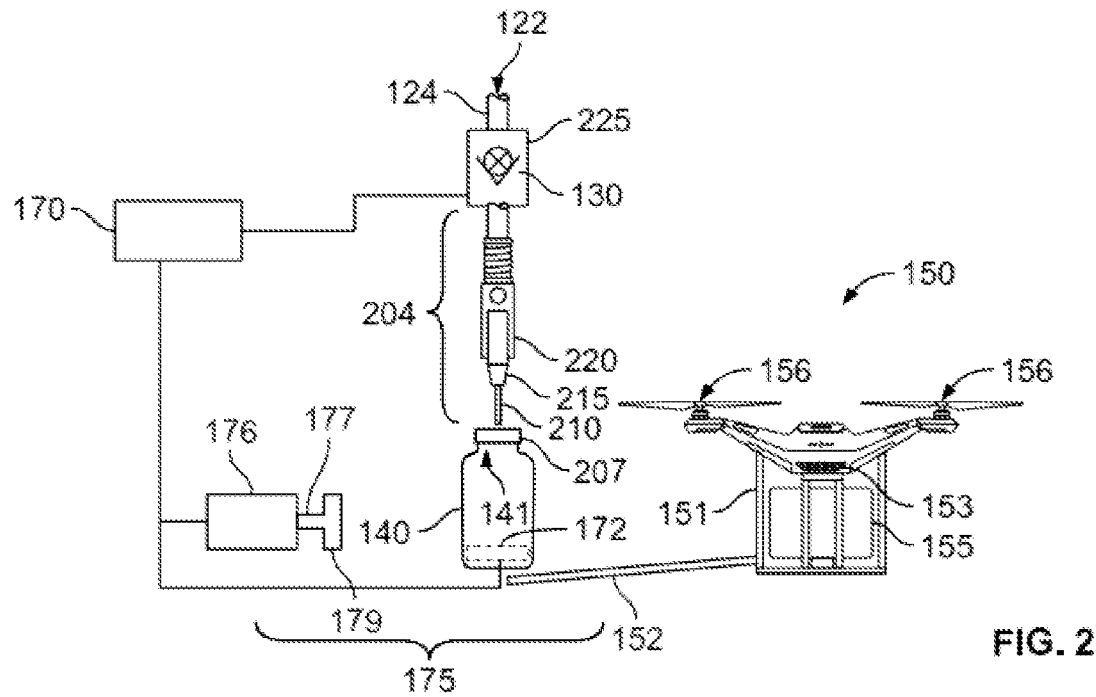
FIG. 2 depicts a schematic of an illustrative filling head mechanism for discharging a fluid sample into a sample container, according to one or more embodiments.

FIG. 2 depicts a schematic of an illustrative filling head mechanism 204 for discharging the fluid sample into the sample container 140, according to one or more embodiments. The filling head mechanism 204 can be utilized to discharge the lubricating fluid 122 within the apparatus conduit 124 into the sample container 140. The filling head mechanism 204 can be in fluid communication with the valve 130 and the apparatus conduit 124, and can be configured to and adapted to discharge the lubricating fluid 122 within the apparatus conduit 124 into the sample container 140. For example, the filling head mechanism 204 can include a piercing head or nozzle 210, an inner cylinder 215, and an outer cylinder 220. The piercing head 210, the inner cylinder 215, and the outer cylinder 220 can each include a passage therethrough that can be in fluid communication with each other and the valve 130.

A filling head mechanism arm 225 can support, move, and position the filling head mechanism 204 to provide the fluid sample into the sample container 140. The filling head mechanism arm 225 can include motors and actuators to facilitate its movements and can be controlled by the sample controller 170. The filling head mechanism arm 225 can include the valve 130. The valve 130 can be configured to or adapted to open and close with a motion of the filling head mechanism arm 225 and/or the filling head mechanism 204. For example, in operation upon receipt of signals from the sample controller 170, the filling head mechanism arm 225 can position the filling head mechanism 204 above a lid 207, wherein the lid 207 can be sealingly disposed about the aperture 141 of the sample container 140, sealing the interior volume of the sample container 140 from the environment outside the sample container 140. The filling head mechanism arm 225 can pierce the lid 207 with the piercing head 210 by pressing the piercing head 210 into the lid 207 with sufficient force to create an opening through the lid 207 through which the piercing head 210 can enter the interior volume of the sample container 140. After piercing the lid 207, the filling head mechanism arm 225 can continue to press the filling head mechanism 204 toward the sample container 140 such that the inner cylinder 215 can move within the outer cylinder 220. The inner cylinder 215 can be in mechanical communication with the valve 130 such that the motion of the inner cylinder 215 within the outer cylinder 220 can cause the valve 130 to open and allow a portion of the lubricating fluid 122 within the apparatus conduit 124 to discharge into the sample container 140.

The sample controller 170 can send signals to the filling head mechanism arm 225 to lift the filling head mechanism 204 and remove the piercing head 210 from the lid 207. As the filling head mechanism arm 225 lifts the filling head mechanism 204, the inner cylinder 215 can extend from the outer cylinder 220 and the motion can cause the valve 130 to close, stopping the flow of the lubricating fluid 122. The opening in the lid 207 can be self-sealing such that the fluid sample can be secured within the sample container 140. For clarity, the filling head mechanism can be any mechanism capable of discharging the fluid sample into the sample container 140. Before, during, or after discharging at least a portion of the fluid sample into the sample container 140, the one or more sample sensors 172 can perform one or more analyses on the lubricating fluid 122 and the sensor data can be sent to the sample controller 170 via hardline or radio frequency communications. After discharging the fluid sample into the sample container 140, the retention and loading mechanism 175 can dispose the sample container 140 onto the unmanned aerial vehicle 150. The unmanned aerial vehicle 150 can transport the sample container 140 to another location, for example to a lab or remote location for analysis and/or testing.

Figure 3:
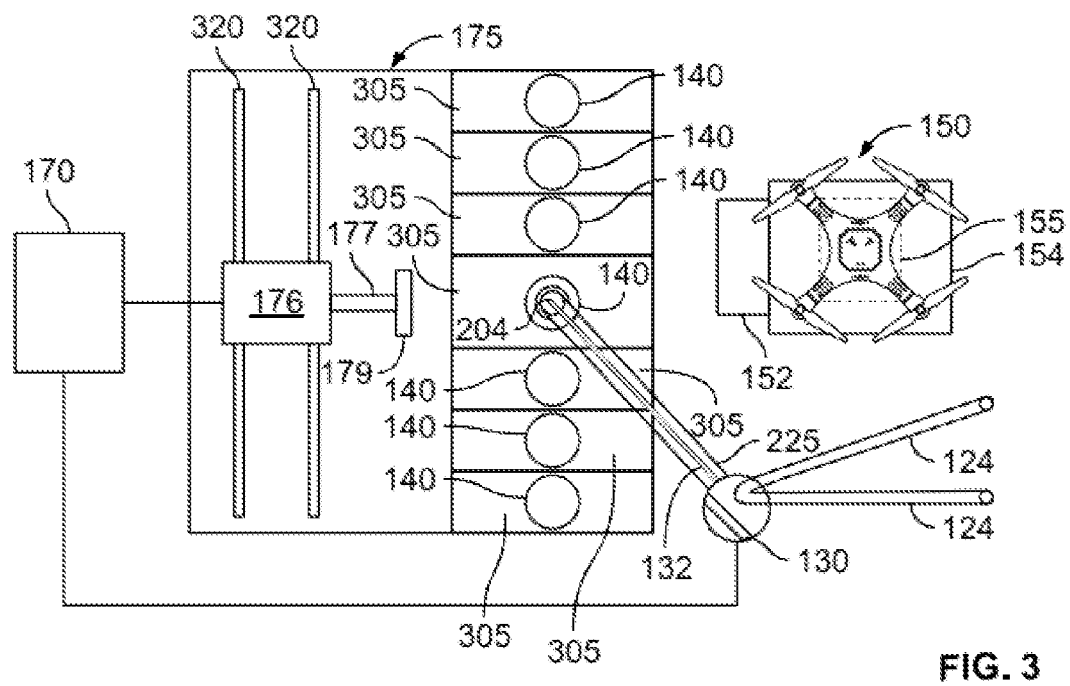
FIG. 3 depicts a schematic of an illustrative retention and loading mechanism for positioning and moving one or more sample containers, according to one or more embodiments.

FIG. 3 depicts a schematic of an illustrative retention and loading mechanism 175 for positioning and moving one or more sample containers 140, according to one or more embodiments. The retention and loading mechanism 175 can include the cylinder 176, piston 177, and head 179, one or more sample container stations 305 (seven are shown) and one or more guides 320 (two are shown). The retention and loading mechanism 175 can include additional actuators for positioning and moving the one or more sample containers 140. The retention and loading mechanism 175 can include or can be one or more robotic arms and/or clamping mechanisms which can be combined with or can take the place of the cylinder 176, piston 177, and head 179.

Each sample container station 305 can receive, hold, and/or move one or more sample containers 140 (one is shown within each station). For example, each sample container station 305 can include a conveyance system for moving the one or more sample containers 140 about and/or between the sample container stations 305. One or more multi-axis or omnidirectional conveyor rollers can be disposed within each sample container station 305 to move the one or more sample containers 140 about and/or between each sample container station 305. Each sample container station 305 can also include a securing mechanism, such as a clamp that can grasp at least a portion of each sample container 140, or protrusions configured to and adapted to surround at least a portion of each sample containers 140 to secure one or more sample containers 140 within each sample container station 305. Each sample container station 305 can move the one or more sample containers into fluid communication with the valve 130 or the filling head mechanism 204. One or more sample containers 140 can receive one or more fluid samples from the filling head mechanism 204, as described above. Each sample container 140 can be moved, for example by the conveyor rollers, robotic arms, or by the cylinder 176, piston 177, and head 179, onto the unmanned aerial vehicles 150. The cylinder 176, piston 177, and head 179 can move along the one or more guides 320 to change position such that each of the one or more sample containers 140 can be moved by the cylinder 176, piston 177, and head 179 onto the one or more unmanned aerial vehicles. Although shown in a linear configuration, the container stations 305 can be arranged in the shape of a carousel, an arc, or have any shape or configuration.

The valve 130 can be configured to and adapted to recirculate the lubricating fluid 122 within the apparatus conduit 124 when a fluid sample is not being taken. The valve can be configured to and adapted to place the sample container 140, the sample conduit 132, and the apparatus conduit 124 in fluid communication when a fluid sample is required and subsequently reconfigure the valve 130 to recirculate the lubricating fluid 122 within the apparatus conduit 124. The valve 130 can be configured to and adapted to purge the filling head mechanism 204 and the sample conduit 132 before and/or after a fluid sample is taken. For example, the valve 130 can be configured to and adapted to draw fluid from the filling head mechanism 204 and the sample conduit 132 and recirculate the fluid through the apparatus conduit 124, e.g., back to the flow path 120 and/or into the reservoir 160. In other examples, the valve 130 can be configured to and adapted to discharge fluid within the filling head mechanism 204 and the sample conduit 132, so as to purge the sample conduit 132 and the filling head mechanism 204, into a slop container or reservoir. The slop container can be located within one of the sample container stations 305. The slop container can be in fluid communication with the apparatus conduit 124 and/or the fluid path 120 for recycling any fluid within the slop container back to the fluid path 120.

Each sample container station 305 can include one or more accelerometers, one or more load cells, one or more proximity sensors, one or more volume flowmeters, and/or one or more Time of Flight sensors to detect changes in the mass of one or more sample containers 140 within the boundaries of a given sample container station 305. In operation, the one or more accelerometers, one or more load cells, one or more proximity sensors, one or more volume flowmeters, and/or one or more Time of Flight sensors can be utilized to determine the amount of fluid within a given sample container 140 and can send signals to the sample controller 170. Based on the signals received from the one or more accelerometers, one or more load cells, one or more proximity sensors, one or more volume flowmeters, and/or one or more Time of Flight sensors, the sample controller 170 can send signals to stop the flow of fluid into a given sample container 140 and to command an unmanned aerial vehicle 150 to transport the given sample container 140 to another location.

Figure 4:
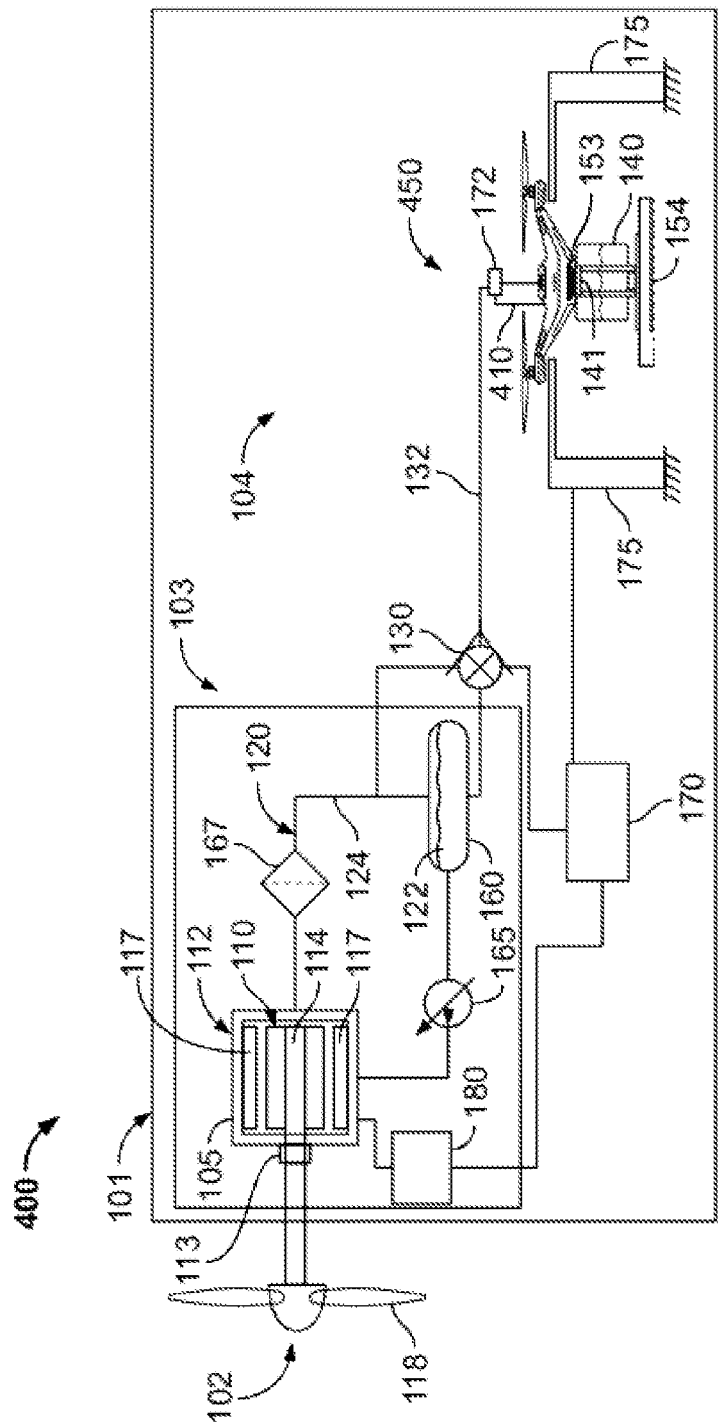
FIG. 4 depicts a schematic of another illustrative system for collecting and transporting a fluid sample, according to one or more embodiments.

FIG. 4 depicts a schematic of another illustrative system for collecting and transporting a fluid sample 400, according to one or more embodiments. The system for collecting and transporting a fluid sample 400 can include the unmanned aerial vehicle 450. The unmanned aerial vehicle 450 can be sealingly disposed upon the sample container 140. For example, the unmanned aerial vehicle 450 can seal the aperture 141 in the sample container 140, acting as a lid to the sample container 140, for example the lid 207 with reference to FIG. 2. One or more fluid samples can be discharged into the sample container 140, through the unmanned aerial vehicle 450. For example, the unmanned aerial vehicle 150 can be releasably docked above the unmanned aerial vehicle station 154 on the retention and loading mechanism 175. The unmanned aerial vehicle 450 can include an aperture though which lubricating fluid 122 can flow between the valve 130 and the sample container 140. The aperture can include a mechanical iris that can be opened and closed to unseal and seal the sample container 140. After receiving the fluid sample, the retention and loading mechanism 175 can release the unmanned aerial vehicle 450 and the unmanned aerial vehicle 450 can transport the fluid sample to another location, for example to a lab or remote location for analysis and/or testing. The unmanned aerial vehicle 450 sealingly disposed upon the sample container 140 can be very small as compared to typical cargo carrying unmanned aerial vehicles.

The one or more sample sensors 172 can be disposed on the unmanned aerial vehicle 172 or within the sample container 140, or within the fluid line itself somewhere else in the system. The one or more sample sensors 172 can contact a portion of the fluid sample before, during, or after the lubricating fluid 122 is discharged into the sample container 140. Prior to or after release from the retention and loading mechanism 175, the vehicle controller 153 can send signals to the one or more sample sensors 172, via a hardline or radio frequency communication interface 410, for the one or more sample sensors 172 to perform one or more analyses and/or tests on the fluid sample. The sensor data from the one or more analyses and/or tests can be sent to the vehicle controller 153 and/or the sample controller 170 via the hardline or radio frequency communication interface 410. As described above, the sensor data can support decisions regarding additional fluid sampling analyses and/or testing, apparatus for generating power or electricity 103 operational parameters, and/or maintenance planning and execution for the apparatus for generating power or electricity 103.

Figure 5:
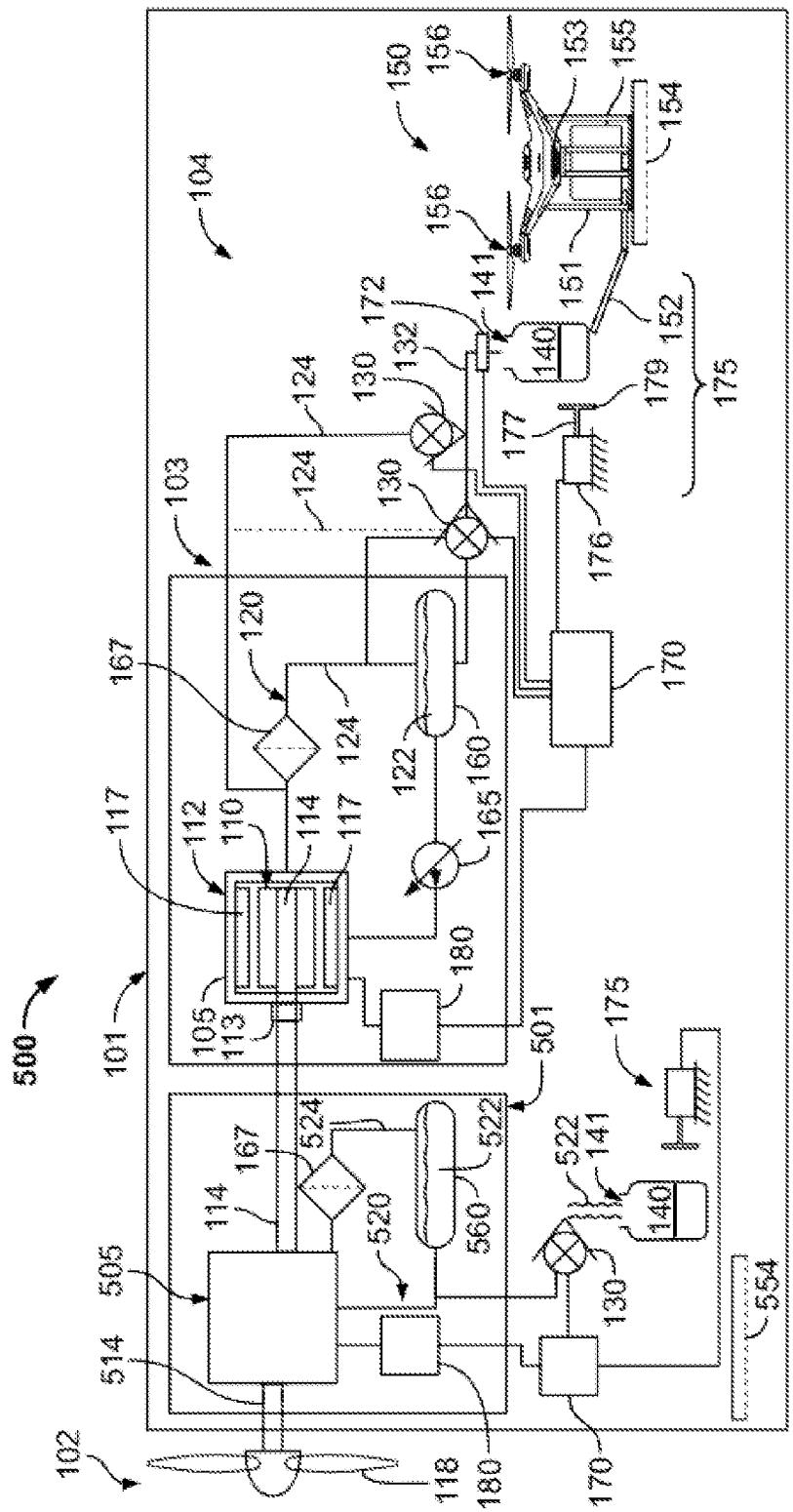
FIG. 5 depicts a schematic of yet another illustrative system for collecting and transporting a fluid sample, according to one or more embodiments.

FIG. 5 depicts a schematic of yet another illustrative system for collecting and transporting a fluid sample 500, according to one or more embodiments. The system for collecting and transporting a fluid sample 500 can include one or more unmanned aerial vehicles 150 (only one is shown) stationed or located at a first unmanned aerial vehicle station 154 (as shown), at a second unmanned aerial vehicle station 554, or another location. The system 500 can also include the apparatus for generating power or electricity 103 as a first apparatus for generating power or electricity 103, a second apparatus for generating power or electricity 501, and a first and second retention and loading mechanism 175 within the enclosure 101. The first apparatus for generating power or electricity 103 can include the lubricating fluid 122 as a first lubricating fluid 122, the filter 167 as a first filter 167, and the fluid path 120 as a first fluid path 120. The first apparatus for generating power or electricity 103 can be in fluid communication with two or more valves 130, for example a first valve and a second valve. The first and second valves 130 can be configured or adapted to provide fluid samples from one or more locations (three are shown) along the fluid path 120.

The second apparatus for generating power or electricity 501 can include a gear box 505 having a shaft 514 operated to generate power for use by the generator 105. For example, the shaft 514 can be coupled at one end to the rotor 102 and at the other end to the gear box 505 which can be coupled to the rotatable shaft 114 for communicating rotational energy from the rotor 102 to the generator 105. The gear box 505, the shaft 514, and the rotatable shaft 114 can be in fluid communication with a second lubricating fluid 522 in a second fluid path 520. The second fluid path 520 can include the gear box 505 in fluid communication with a gear box lubricating fluid conduit 524, a second filter 167, a reservoir 560, and a second valve 130. The second lubricating fluid 522 can provide lubrication to one or more movable parts within the gear box 505, the shaft 514, and the moveable shaft 114. The fluid within the second fluid path 520 can be pressurized to cause the second lubricating fluid 522 to flow through at least a portion of the second fluid path 520. For example, while moving, the one or more movable parts within the gear box 505 and the shafts 514, 114 can pressurize the second lubricating fluid 522, causing the second lubricating fluid 522 to flow through at least a portion of the second fluid path 520. In other examples, a separate pump and/or pump 165 can pressurize the second lubricating fluid 522 within the second fluid path 520 to cause the second lubricating fluid 522 to flow through at least a portion of the second fluid path 520.

During fluid sampling operations, fluid samples can be taken from the first apparatus for generating power or electricity 103 and the second apparatus for generating power or electricity 501. For example, a first fluid sample can be discharged from the first apparatus for generating power or electricity 103 into a first sample container 140. A second fluid sample can be discharged from the second apparatus for generating power or electricity 501 into a second sample container 140. The first sample container 140 can be disposed on the unmanned aerial vehicle 150 by the first retention and loading mechanism 175. The unmanned aerial vehicle 150 can transport the first sample container 140 from the first unmanned aerial vehicle station 154 to the second unmanned aerial vehicle station 554 and the second sample container 140 can be disposed on the unmanned aerial vehicle 150 by the second retention and loading mechanism 175. Subsequently, the unmanned aerial vehicle can transport the first sample container 140 and the second sample container 140 to another location, for example to a lab or remote location for analysis and/or testing. In other examples, the first and second fluid samples can be routed to the first or second retention and loading mechanism 175

A process for collecting and transporting a fluid sample can include opening the valve 130 to discharge a sample of the lubricating fluid 122 and/or the lubricating fluid 522 from the fluid path 120 and/or the fluid path 520 of the apparatus for generating power or electricity 103 into a sample container 140. The apparatus for generating power or electricity 103 can include the rotatable shaft 114, the one or more other moving parts 110, and the fluid path 120 and/or the fluid path 520 containing the lubricating fluid 122 and/or the lubricating fluid 522 wherein the rotatable shaft 114, the one or more other moving parts 110, or both can be in fluid communication with the lubricating fluid 122 and/or the lubricating fluid 522 in the fluid path 120 and/or the fluid path 520. The lubricating fluid 122 and/or the lubricating fluid 522 can be pressurized within the fluid path 120 and/or the fluid path 520 by the apparatus for generating power or electricity 103. The fluid path 120 and/or the fluid path 520 can be housed within the apparatus for generating power or electricity 103. The valve 130 can be in fluid communication with the fluid path 120 and/or the fluid path 520 and can be opened to start a flow of or discharge the fluid sample into the sample container 140. The sample container 140 can be external to the apparatus for generating power or electricity 103 and in fluid communication with the valve 130. A retention and loading mechanism 175 can be adjacent the apparatus, proximate the apparatus, and/or disposed on the unmanned aerial vehicle 150 and can be configured to dispose, removably place, or attach the sample container on a portion of the unmanned aerial vehicle 150. At least one unmanned aerial vehicle station 154 can be disposed on or about the apparatus for generating power or electricity 103, wherein the at least one unmanned aerial vehicle station 154 can be configured to or adapted to dock or receive the unmanned aerial vehicle 150. The unmanned aerial vehicle 150 can contain the sample container 140. The unmanned aerial vehicle 150 can be dispatched or commanded to transport the sample container to another location, for example a second unmanned aerial vehicle station 154 disposed on or about the apparatus for generating power or electricity 103, another unmanned aerial vehicle station 154 disposed on or about another apparatus for generating power or electricity 103, or another location. The process can further include discharging a first fluid sample from a first location along the fluid path 120 and/or the fluid path 520 into a first interior volume within the sample container 140 to provide a first fluid sample within the sample container 140 and/or discharging a second fluid sample from a second location along the fluid path 120 and/or the fluid path 520 into a second interior volume within the sample container 140 to provide a second fluid sample within the sample container 140. The process can further include piercing a surface of the sample container 140 with a filling head mechanism 204, wherein the filling head mechanism 204 can be in fluid communication with the valve 130 and, after piercing, an interior volume of the sample container 140. The process can further include opening the valve 130 to discharge a sample of the lubricating fluid 122 and/or the lubricating fluid 522 in the fluid path 120 and/or the fluid path 520 into the sample container 140, wherein a portion of an exterior surface of the sample container can include a visible identifying symbol. The visible identifying symbol can be printed, affixed, or otherwise disposed on the exterior surface of the sample container 140.

The process can further include introducing at least a portion of the fluid sample onto the one or more sample sensors 172 to analyze at least one physical property of the fluid sample, generating sensor data related to the at least one physical property; sending the sensor data to the sample controller 170, wherein the sample controller 170 receives the sensor data and compares the sensor data to data within the lookup table; and determining a need for further lubricating fluid analyses and/or testing by comparing the received sensor data with at least one predetermined sensor data parameter threshold from the lookup table. The process can further include sending a signal from the sample controller 170 to the apparatus controller 180 to modify and maintain at least one operating parameter of the apparatus for generating power or electricity 103 at, below, or above a pre-determined value or range of values, wherein the pre-determined value or range of values is taken from the look up table. The process can also include releasing, via the retention and loading mechanism 175, the sample container 140 from an unmanned aerial vehicle station 154; and commanding the unmanned aerial vehicle 150 to transport the fluid sample to another location separate from the apparatus.

Figure 6:
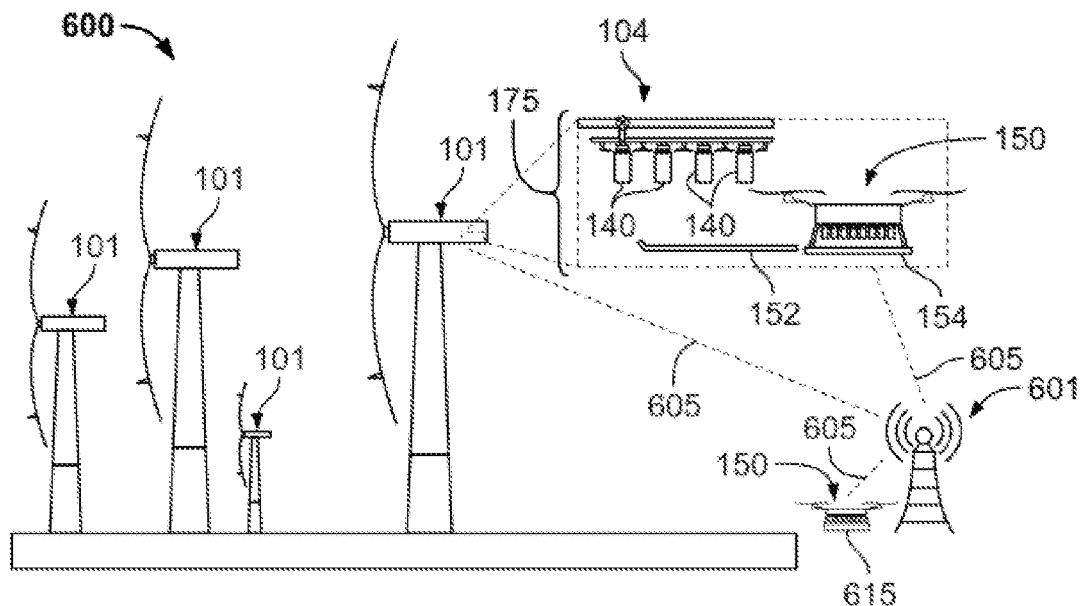
FIG. 6 depicts a schematic of an illustrative wind turbine farm including an illustrative fluid sampling and transportation system, according to one or more embodiments.
Figure 7:
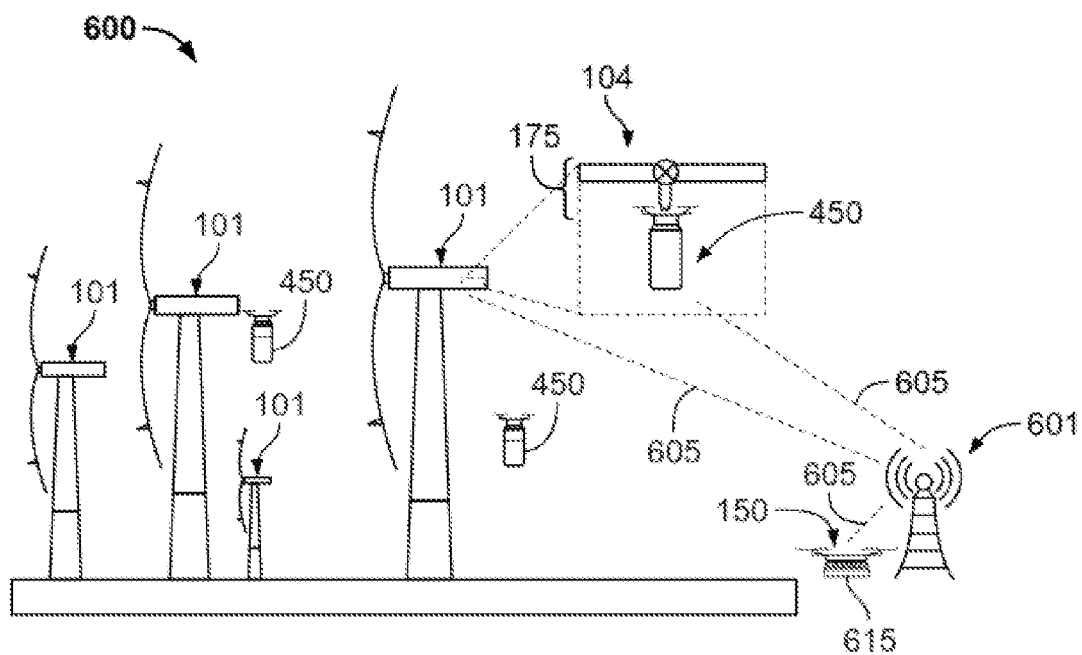
FIG. 7 depicts a schematic of the illustrative wind turbine farm of FIG. 6 including another embodiment of the illustrative fluid sampling and transporting system, according to one or more embodiments.

FIG. 6 depicts a schematic of an illustrative wind turbine farm 600 including an illustrative fluid sampling and transportation system 104, according to one or more embodiments. FIG. 7 depicts a schematic of the illustrative wind turbine farm 600 of FIG. 6 including another embodiment of the illustrative sampling and transporting system 104, according to one or more embodiments. Referring to FIGS. 6 and 7, each enclosure 101 can include a fluid sampling and transportation system 104 for sampling and transporting lubricating fluid to and from one or more locations. Each fluid sampling and transportation system 104 can include one or more sample containers 140 and/or one or more unmanned aerial vehicles 150, 450 for transporting one or more sample containers 140 to and from each enclosure 101 and other locations. For example, two or more enclosures 101 can be grouped geographically (four are shown). One or more unmanned aerial vehicles 150, 450 can be stationed or located within the geographic area, for example within the two or more enclosures 101 and/or at a location 615, that can be a central location within the wind turbine farm 600. As needed, one or more sample containers 140 can be disposed within each fluid sampling and transportation system 104. A central dispatch 601 can be communicatively linked with the fluid sampling and transportation systems 104, one or more unmanned aerial vehicle 150, and/or one or more unmanned aerial vehicles 450. The central dispatch 601 can send and receive signals 605 to and from the fluid sampling and transportation systems 104, one or more unmanned aerial vehicles 150, and/or one or more unmanned aerial vehicles 450 to command and control the discharging and transporting of fluid samples from the one or more apparatus for generating power or electricity 103, as described above, within each enclosure 101.

In examples, the one or more unmanned aerial vehicles 150 can be configured to or adapted to transport one or more unmanned aerial vehicles 450. As described above, the one or more unmanned aerial vehicles 450 can be sealingly disposed upon the sample containers 140. When filled with a fluid sample, each unmanned aerial vehicle 450 can be disposed within one of the unmanned aerial vehicles 150. For example, each unmanned aerial vehicle 450 can travel to, land in, or land on and/or dock with one of the unmanned aerial vehicles 150. In other examples, one or more unmanned aerial vehicles 450 can be moved by the retention and loading mechanism 175 onto one of the unmanned aerial vehicles 150 which can be disposed on the unmanned aerial vehicle station 154. The retention and loading mechanism 175 can removably place or attach one or more of the unmanned aerial vehicles 450 onto the one unmanned aerial vehicle 150. The unmanned aerial vehicle 150 can transport all of the one or more unmanned aerial vehicles 450, docked thereto or otherwise disposed thereon, to another location, for example a testing lab located outside the wind turbine farm geographic area.

The flight range of the one or more unmanned aerial vehicles 450, each sealingly disposed upon a sample container 140, can be different from the flight range of the one or more unmanned aerial vehicles 150. For example, the one or more unmanned aerial vehicles 450, each sealingly disposed upon a sample container 140, may have a flight range that is limited to flying within the wind turbine farm 600 and the flight range for the one or more unmanned aerial vehicles 150 may be significantly greater, such that only the one or more unmanned aerial vehicles 150 have a flight range sufficient to transport to a location outside the wind turbine farm 600, for example to a test lab located outside of the geographic area of the wind turbine farm 600. Utilizing different unmanned aerial vehicles 150, 450 can reduce the overall costs associated with lubricating fluid sampling and transportation.

In some examples, the unmanned aerial vehicle 450, sealingly disposed upon the sample container 140, could be packaged into a smaller form factor than the unmanned aerial vehicles 150. Smaller unmanned aerial vehicles could fit in smaller spaces. Utilizing smaller unmanned aerial vehicles might allow access to parts of the enclosure 101 that larger unmanned aerial vehicles cannot access, providing greater flexibility for users. Smaller unmanned aerial vehicles may also have an overall lower cost than larger unmanned aerial vehicles. There is also a potential for better range to weight ratios with smaller unmanned aerial vehicles. Smaller unmanned aerial vehicles may also allow for a smaller retrofit volume within the enclosure 101, allowing additional cost savings over one or more larger unmanned aerial vehicles.

The present disclosure further relates to any one or more of the following numbered embodiments:

1. A system for collecting and transporting a fluid sample, comprising: at least one apparatus for generating power or electricity, wherein the at least one apparatus comprises a rotatable shaft, one or more other moving parts, and at least one fluid path containing a lubricating fluid, wherein the rotatable shaft, the one or more other moving parts, or both are in fluid communication with the lubricating fluid in the at least one fluid path; at least one sample container; at least one valve in fluid communication with the at least one fluid path and in fluid communication with the at least one sample container, wherein the at least one valve is configured to open and discharge a sample of the lubricating fluid from the at least one fluid path into the at least one sample container; at least one unmanned aerial vehicle configured to transport the at least one sample container to a location separate from the at least one apparatus; at least one unmanned aerial vehicle station disposed on or about the at least one apparatus, the at least one unmanned aerial vehicle station configured to dock or receive the at least one unmanned aerial vehicle; and at least one retention and loading mechanism disposed on or adjacent to the at least one apparatus, the at least one retention and loading mechanism configured to release the at least one sample container from or move the at least one sample container to or about the at least one unmanned aerial vehicle station.

2. The system of paragraph 1, wherein the at least one unmanned aerial vehicle is disposed on the at least one unmanned aerial vehicle station, and the retention and loading mechanism is configured to removably place or attach the at least one sample container on a portion of the at least one unmanned aerial vehicle.

3. The system of paragraphs 1 or 2, wherein the at least one sample container comprises a first sample container and a second sample container, and wherein the unmanned aerial vehicle is configured to transport the first sample container and the second sample container to the location.

4. The system according to any of paragraphs 1 to 3, wherein the at least one unmanned aerial vehicle comprises a first unmanned aerial vehicle and a second unmanned aerial vehicle, and wherein the first unmanned aerial vehicle is configured to dock with the second unmanned aerial vehicle and the second unmanned aerial vehicle is configured to transport the first unmanned aerial vehicle to the location.

5. The system according to any of paragraphs 1 to 4, wherein the at least one unmanned aerial vehicle comprises a first unmanned aerial vehicle and a second unmanned aerial vehicle and wherein the retention and loading mechanism is configured to move the second unmanned aerial vehicle onto the first unmanned aerial vehicle.

6. The system according to any of paragraphs 1 to 5, further comprising one or more sample container stations wherein each sample container station is configured to secure and/or move the one or more sample containers into fluid communication with the at least one valve.

7. The system according to any of paragraphs 1 to 6, wherein: the at least one apparatus for generating power or electricity comprises a first apparatus for generating power or electricity and a second apparatus for generating power or electricity, the first apparatus comprises a first fluid path, the second apparatus comprises a second fluid path, the at least one valve comprises a first valve and a second valve, the at least one sample container comprises a first sample container external to the first apparatus and a second sample container external to the second apparatus, the at least one unmanned aerial vehicle station comprises a first unmanned aerial vehicle station disposed on or about the first apparatus and a second unmanned aerial vehicle station disposed on or about the second apparatus, the at least one retention and loading mechanism comprises a first retention and loading mechanism disposed on or adjacent to the first apparatus and a second retention and loading mechanism disposed on or adjacent to the second apparatus, the first valve is in fluid communication with the first fluid path and is in fluid communication with the first sample container, wherein the first valve is configured to open and discharge a sample of the lubricating fluid from the first fluid path into the first sample container, the second valve is in fluid communication with the second fluid path and is in fluid communication with the second sample container, wherein the second valve is configured to open and discharge a sample of the lubricating fluid from the second fluid path into the second sample container, the first retention and loading mechanism is configured to move the first sample container to or about the first unmanned aerial vehicle station, the second retention and loading mechanism is configured to move the second sample container to or about the second unmanned aerial vehicle station, and the at least one unmanned aerial vehicle is configured to transport the first sample container to the location.

8. The system according to any of paragraphs 1 to 7, wherein the at least one unmanned aerial vehicle is disposed on the first unmanned aerial vehicle station, and wherein the first retention and loading mechanism is configured to removably place or attach the first sample container on a portion of the at least one unmanned aerial vehicle disposed on the first unmanned aerial vehicle station.

9. The system according to any of paragraphs 1 to 8, wherein the at least one apparatus further comprises a pump, wherein the pump is configured to pressurize the lubricating fluid within the at least one fluid path.

10. A process for collecting and transporting a fluid sample, comprising: opening at least one valve to discharge at least one sample of lubricating fluid in at least one fluid path into at least one sample container, wherein the at least one fluid path is located within an apparatus, and wherein: the apparatus is configured to generate power or electricity, the apparatus comprises a rotatable shaft, one or more other moving parts, wherein the rotatable shaft, the one or more other moving parts, or both are in fluid communication with the lubricating fluid in the at least one fluid path, at least one sample container that is external to the at least one apparatus; at least one unmanned aerial vehicle that is configured to transport the at least one sample container containing the at least one sample of lubricating fluid to another location separate from the at least one apparatus, at least one unmanned aerial vehicle station that is disposed on or about the at least one apparatus, wherein the at least one unmanned aerial vehicle station is configured to dock or receive the at least one unmanned aerial vehicle, and at least one retention and loading mechanism that is disposed on or adjacent to the at least one apparatus, wherein the at least one retention and loading mechanism is configured to move the at least one sample container to or about the at least one unmanned aerial vehicle station; disposing, via the at least one retention and loading mechanism, the at least one sample container onto the at least one unmanned aerial vehicle; and transporting, via the unmanned aerial vehicle, the at least one sample of lubricating fluid to a location separate from the apparatus.

11. The process of paragraph 10, wherein: the at least one valve is in fluid communication with the at least one fluid path at a first location along the at least one fluid path and a second location along the at least one fluid path, the at least one sample of lubricating fluid comprises a first sample of lubricating fluid and a second sample of lubricating fluid; the at least one sample container comprises a first interior volume and a second interior volume, and the first sample of lubricating fluid is discharged from the first location along the at least one fluid path and discharged into the first interior volume, and the second sample of lubricating fluid is discharged from the second location along the at least one fluid path and discharged into the second interior volume.

12. The process of paragraphs 10 or 11, wherein: the at least one valve comprises a first valve and a second valve, the first valve is in fluid communication with the at least one fluid path at a first location along the at least one fluid path, the second valve is in fluid communication with the at least one fluid path at a second location along the at least one fluid path, the at least one sample of lubricating fluid comprises a first sample of lubricating fluid and a second sample of lubricating fluid, the at least one sample container comprises a first interior volume and a second interior volume, the first sample of lubricating fluid is discharged from the first location along the at least one fluid path, through the first valve, and discharged into the first interior volume, and the second sample of lubricating fluid is discharged from the second location along the at least one fluid path, through the second valve, and discharged into the second interior volume.

13. The process according to any of paragraphs 10 to 12, further comprising commanding the at least one unmanned aerial vehicle to transport at least one empty sample container to the at least one unmanned aerial vehicle station.

14. The process according to any of paragraphs 10 to 13, further comprising disposing metadata to an outer surface of the sample container.

15. The process according to any of paragraphs 10 to 14, further comprising associating metadata with the at least one sample container via an identifying symbol, wherein an exterior surface of the at least one sample container comprises an identifying symbol.

16. The process according to any of paragraphs 10 to 15, further comprising: introducing at least a portion of the sample of lubricating fluid onto a sample sensor to analyze at least one physical property of the sample of lubricating fluid; generating sensor data related to the at least one physical property; sending the sensor data to a sample controller, wherein the sample controller receives the sensor data and compares the sensor data to data within a lookup table; and determining a need for further lubricating fluid testing by comparing the received sensor data with at least one predetermined sensor data parameter threshold from the lookup table.

17. The process according to any of paragraphs 10 to 16, further comprising: receiving a signal from an apparatus controller by a sample controller indicating at least one operating parameter of the apparatus for generating power or electricity is outside a pre-determined value or range of values; and sending one or more signals, from the sample controller to open and close the at least one valve to discharge the at least one sample of the lubricating fluid in the at least one fluid path into the at least one sample container.

18. The process according to any of paragraphs 10 to 17, wherein the apparatus further comprises a pump, wherein the pump is configured to pressurize the lubricating fluid within the at least one fluid path.

19. A process for collecting and transporting a fluid sample, comprising: piercing a surface of a sample container with a filling head mechanism, wherein the filling head mechanism is in fluid communication with a valve and, after piercing, an interior volume of the sample container; opening the valve to discharge a sample of a lubricating fluid in a fluid path into the sample container, wherein the fluid path is located within an apparatus, and wherein: the apparatus is configured to generate power and electricity, the apparatus comprises a rotatable shaft and one or more other moving parts, wherein the rotatable shaft, the one or more other moving parts, or both are in fluid communication with the lubricating fluid in the fluid path, the sample container is external to the apparatus; an unmanned aerial vehicle is configured to transport the sample container containing the sample of the lubricating fluid to a location separate from the apparatus, an unmanned aerial vehicle station is disposed on or about the apparatus, wherein the unmanned aerial vehicle station is configured to dock or receive the at least one unmanned aerial vehicle, and a retention and loading mechanism is disposed on or adjacent to the apparatus, wherein the retention and loading mechanism is configured to move the sample container to or about the unmanned aerial vehicle station; associating metadata with the sample container, wherein a portion of an exterior surface of the sample container comprises a visible identifying symbol, the metadata comprises data that identifies the apparatus, the time and date the sample of lubricating fluid was discharged into the sample container, and at least one operating parameter of the apparatus at the time the sample of lubricating fluid was discharged; removably placing or attaching the sample container to a portion of the unmanned aerial vehicle disposed on the unmanned aerial vehicle station; and commanding the unmanned aerial vehicle to transport the sample of lubricating fluid to the location.

20. The process of paragraph 19, further comprising: introducing at least a portion of the sample of lubricating fluid onto a sample sensor to analyze at least one physical property of the fluid; generating sensor data related to the at least one physical property; sending the sensor data to a sample controller, wherein the sample controller receives the sensor data and compares the sensor data to data within a lookup table; and determining a need for further sample of lubricating fluid testing by comparing the received sensor data with at least one predetermined sensor data parameter threshold from the lookup table.

21. The process of paragraphs 19 or 20, further comprising: sending a signal from the sample controller to an apparatus controller to modify and maintain at least one operating parameter of the apparatus at, below, or above a pre-determined value or range of values, wherein the pre-determined value or range of values is taken from the look up table.

22. The process according to any of paragraphs 19 to 21, further comprising: receiving a signal from an apparatus controller indicating at least one operating parameter of the apparatus is outside a pre-determined value or range of values; and sending one or more signals, from the sample controller, to open and close the valve to discharge a sample of the lubricating fluid in the fluid path into the sample container.

23. The process according to any of paragraphs 19 to 22, wherein the apparatus further comprises a pump, wherein the pump is configured to pressurize the lubricating fluid within the fluid path.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

The invention claimed is:

1. A system for collecting and transporting a fluid sample, comprising:
   at least one apparatus for generating power or electricity,
      wherein the at least one apparatus comprises a rotatable shaft, one or more other moving parts, and at least one fluid path containing a lubricating fluid,
      wherein the rotatable shaft, the one or more other moving parts, or both are in fluid communication with the lubricating fluid in the at least one fluid path;
   at least one sample container;
   at least one valve in fluid communication with the at least one fluid path and in fluid communication with the at least one sample container,
      wherein the at least one valve is configured to open and discharge a sample of the lubricating fluid from the at least one fluid path into the at least one sample container;
   at least one unmanned aerial vehicle configured to transport the at least one sample container to a location separate from the at least one apparatus;
   at least one unmanned aerial vehicle station disposed on or about the at least one apparatus, the at least one unmanned aerial vehicle station configured to dock or receive the at least one unmanned aerial vehicle; and
   at least one retention and loading mechanism disposed on or adjacent to the at least one apparatus, the at least one retention and loading mechanism configured to release the at least one sample container from or move the at least one sample container to or about the at least one unmanned aerial vehicle station.

2. The system of claim 1, wherein the at least one unmanned aerial vehicle is disposed on the at least one unmanned aerial vehicle station, and the retention and loading mechanism is configured to removably place or attach the at least one sample container on a portion of the at least one unmanned aerial vehicle.

3. The system of claim 1, wherein the at least one sample container comprises a first sample container and a second sample container, and wherein the unmanned aerial vehicle is configured to transport the first sample container and the second sample container to the location.

4. The system of claim 1, wherein the at least one unmanned aerial vehicle comprises a first unmanned aerial vehicle and a second unmanned aerial vehicle, and wherein the first unmanned aerial vehicle is configured to dock with the second unmanned aerial vehicle and the second unmanned aerial vehicle is configured to transport the first unmanned aerial vehicle to the location.

5. The system of claim 1, wherein the at least one unmanned aerial vehicle comprises a first unmanned aerial vehicle and a second unmanned aerial vehicle and wherein the retention and loading mechanism is configured to move the second unmanned aerial vehicle onto the first unmanned aerial vehicle.

6. The system of claim 1, further comprising one or more sample container stations wherein each sample container station is configured to secure and/or move the one or more sample containers into fluid communication with the at least one valve.

7. The system of claim 1, wherein:
   the at least one apparatus for generating power or electricity comprises a first apparatus for generating power or electricity and a second apparatus for generating power or electricity, the first apparatus comprises a first fluid path, the second apparatus comprises a second fluid path,
   the at least one valve comprises a first valve and a second valve,
   the at least one sample container comprises a first sample container external to the first apparatus and a second sample container external to the second apparatus,
   the at least one unmanned aerial vehicle station comprises a first unmanned aerial vehicle station disposed on or about the first apparatus and a second unmanned aerial vehicle station disposed on or about the second apparatus,
   the at least one retention and loading mechanism comprises a first retention and loading mechanism disposed on or adjacent to the first apparatus and a second retention and loading mechanism disposed on or adjacent to the second apparatus,
   the first valve is in fluid communication with the first fluid path and is in fluid communication with the first sample container,
      wherein the first valve is configured to open and discharge a sample of the lubricating fluid from the first fluid path into the first sample container, the second valve is in fluid communication with the second fluid path and is in fluid communication with the second sample container,
      wherein the second valve is configured to open and discharge a sample of the lubricating fluid from the second fluid path into the second sample container, the first retention and loading mechanism is configured to move the first sample container to or about the first unmanned aerial vehicle station, the second retention and loading mechanism is configured to move the second sample container to or about the second unmanned aerial vehicle station,
   and the at least one unmanned aerial vehicle is configured to transport the first sample container to the location.

8. The system of claim 7, wherein the at least one unmanned aerial vehicle is disposed on the first unmanned aerial vehicle station, and wherein the first retention and loading mechanism is configured to removably place or attach the first sample container on a portion of the at least one unmanned aerial vehicle disposed on the first unmanned aerial vehicle station.

9. The system of claim 1, wherein the at least one apparatus further comprises a pump, wherein the pump is configured to pressurize the lubricating fluid within the at least one fluid path.

10. A process for collecting and transporting a fluid sample, comprising:
    opening at least one valve to discharge at least one sample of lubricating fluid in at least one fluid path into at least one sample container, wherein the at least one fluid path is located within at least one apparatus, and wherein:

the at least one apparatus is configured to generate power or electricity, the at least one apparatus comprises a rotatable shaft, one or more other moving parts, wherein the rotatable shaft, the one or more other moving parts, or both are in fluid communication with the lubricating fluid in the at least one fluid path, at least one sample container that is external to the at least one apparatus;

at least one unmanned aerial vehicle that is configured to transport the at least one sample container containing the at least one sample of lubricating fluid to a location separate from the at least one apparatus, at least one unmanned aerial vehicle station that is disposed on or about the at least one apparatus, wherein the at least one unmanned aerial vehicle station is configured to dock or receive the at least one unmanned aerial vehicle, and at least one retention and loading mechanism that is disposed on or adjacent to the at least one apparatus, wherein the at least one retention and loading mechanism is configured to move the at least one sample container to or about the at least one unmanned aerial vehicle station;

disposing, via the at least one retention and loading mechanism, the at least one sample container onto the at least one unmanned aerial vehicle; and transporting, via the unmanned aerial vehicle, the at least one sample of lubricating fluid to the location separate from the at least one apparatus.

11. The process of claim 10, wherein:

the at least one valve is in fluid communication with the at least one fluid path at a first location along the at least one fluid path and a second location along the at least one fluid path, the at least one sample of lubricating fluid comprises a first sample of lubricating fluid and a second sample of lubricating fluid;

the at least one sample container comprises a first interior volume and a second interior volume, and the first sample of lubricating fluid is discharged from the first location along the at least one fluid path and discharged into the first interior volume, and the second sample of lubricating fluid is discharged from the second location along the at least one fluid path and discharged into the second interior volume.

12. The process of claim 10, wherein: the at least one valve comprises a first valve and a second valve, the first valve is in fluid communication with the at least one fluid path at a first location along the at least one fluid path, the second valve is in fluid communication with the at least one fluid path at a second location along the at least one fluid path, the at least one sample of lubricating fluid comprises a first sample of lubricating fluid and a second sample of lubricating fluid, the at least one sample container comprises a first interior volume and a second interior volume, the first sample of lubricating fluid is discharged from the first location along the at least one fluid path, through the first valve, and discharged into the first interior volume, and the second sample of lubricating fluid is discharged from the second location along the at least one fluid path, through the second valve, and discharged into the second interior volume.

13. The process of claim 10, further comprising commanding the at least one unmanned aerial vehicle to transport at least one empty sample container to the at least one unmanned aerial vehicle station.

14. The process of claim 10, further comprising disposing metadata to an outer surface of the sample container.

15. The process of claim 10, further comprising associating metadata with the at least one sample container via an identifying symbol, wherein an exterior surface of the at least one sample container comprises an identifying symbol.

16. The process of claim 10, further comprising:

introducing at least a portion of the at least one sample of lubricating fluid onto a sample sensor to analyze at least one physical property of the at least one sample of lubricating fluid;

generating sensor data related to the at least one physical property;

sending the sensor data to a sample controller, wherein the sample controller receives the sensor data and compares the sensor data to data within a lookup table; and determining a need for further lubricating fluid testing by comparing the received sensor data with at least one predetermined sensor data parameter threshold from the lookup table.

17. The process of claim 10, further comprising:

receiving a signal from an apparatus controller by a sample controller indicating at least one operating parameter of the at least one apparatus for generating power or electricity is outside a pre-determined value or range of values; and sending one or more signals, from the sample controller to open and close the at least one valve to discharge the at least one sample of the lubricating fluid in the at least one fluid path into the at least one sample container.

18. The process of claim 10, wherein the apparatus further comprises a pump, wherein the pump is configured to pressurize the lubricating fluid within the at least one fluid path.

19. A process for collecting and transporting a fluid sample, comprising:

piercing a surface of a sample container with a filling head mechanism, wherein the filling head mechanism is in fluid communication with a valve and, after piercing, an interior volume of the sample container;

opening the valve to discharge a sample of a lubricating fluid in a fluid path into the sample container, wherein the fluid path is located within an apparatus, and wherein:

the apparatus is configured to generate power and electricity, the apparatus comprises a rotatable shaft and one or more other moving parts, wherein the rotatable shaft, the one or more other moving parts, or both are in fluid communication with the lubricating fluid in the fluid path, the sample container is external to the apparatus;

an unmanned aerial vehicle is configured to transport the sample container containing the sample of the lubricating fluid to a location separate from the apparatus, an unmanned aerial vehicle station is disposed on or about the apparatus, wherein the unmanned aerial vehicle station is configured to dock or receive the at least one unmanned aerial vehicle, and a retention and loading mechanism is disposed on or adjacent to the apparatus, wherein the retention and loading mechanism is configured to move the sample container to or about the unmanned aerial vehicle station; associating metadata with the sample container, wherein a portion of an exterior surface of the sample container comprises a visible identifying symbol, the metadata comprises data that identifies the apparatus, the time and date the sample of lubricating fluid was discharged into the sample container, and at least one operating parameter of the apparatus at the time the sample of lubricating fluid was discharged;

removably placing or attaching the sample container to a portion of the unmanned aerial vehicle disposed on the unmanned aerial vehicle station; and commanding the unmanned aerial vehicle to transport the sample of lubricating fluid to the location.

20. The process of claim 19, further comprising:

introducing at least a portion of the sample of lubricating fluid onto a sample sensor to analyze at least one physical property of the lubricating fluid;

generating sensor data related to the at least one physical property;

sending the sensor data to a sample controller, wherein the sample controller receives the sensor data and compares the sensor data to data within a lookup table; and determining a need for further sample of lubricating fluid testing by comparing the received sensor data with at least one predetermined sensor data parameter threshold from the lookup table.

\* \* \* \* \*